E. A. L. ROBERTS.
Method of, and Means for, Increasing the Capacity of Oil-Wells.
No. 5,434. Reissued June 3, 1873.
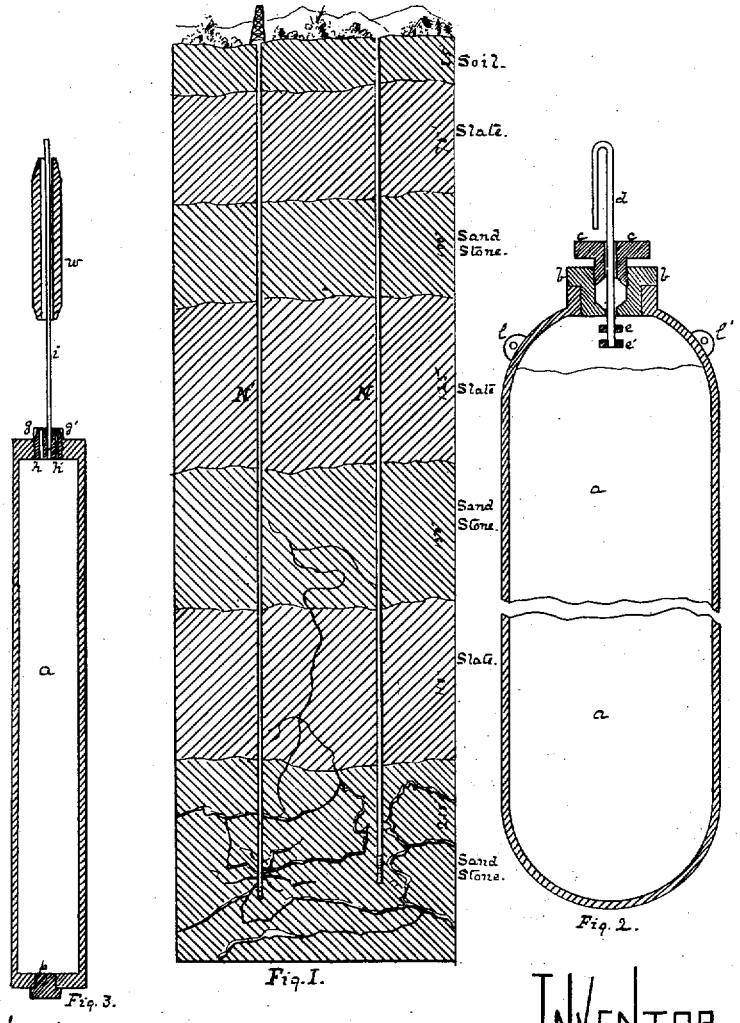
WITNESSES
James S. Gray
R. C. Henderson.
INVENTOR
Edward A. L. Roberts,
by Bakewell, Christy & Hirr
his Attys.

UNITED STATES PATENT OFFICE.

EDWARD A. L. ROBERTS, OF TITUSVILLE, PENNSYLVANIA.

IMPROVEMENT IN METHODS OF AND MEANS FOR INCREASING THE CAPACITY OF OIL-WELLS.

Specification forming part of Letters Patent No. 59,936, dated November 20, 1866; antedated May 20, 1866 reissue No. 5,434, dated June 3, 1873; application filed May 24, 1873.

*To all whom it may concern:*

Be it known that I, EDWARD A. L. ROBERTS, formerly of the city, county, and State of New York, but now of Titusville, in the county of Crawford and State of Pennsylvania, have invented a new and useful Improvement in Process of Increasing the Capacity of Oil-Wells, and also of restoring oil-wells to productiveness, and of apparatus therefor; and I do hereby declare the following to be a full, clear, and exact description thereof:

My invention relates to a new and useful method or process of restoring oil-wells that have become clogged to productiveness; also, of increasing the capacity of oil-wells; and also, to certain improvements in apparatus for causing explosions in such wells.

Petroleum or oil taken from oil-wells is, before it is removed, contained in the seams—usually in the second or third stratum—of sand-stone, or other rock abounding in the oil region, as represented in Fig. 1 of the accompanying drawings.

Figure 1 represents a sectional view of the different stratums of rock usually found in oil-producing regions; and the seams containing the oil are represented by the irregular lines traversing the second and third stratums of sand-stone rock thereon shown. N and N′ represent wells sunk into the rocks. In order to take the oil from the seams or crevices in the rock, wells must be sunk which shall tap or intercept the seams, or some of them, containing the oil. The wells are frequently sunk to a depth of from eight hundred to nine hundred feet below the surface of the earth, and usually from three to six inches in diameter; and it frequently happens that a well will be sunk for a great distance into or through the rock containing the oil without tapping or passing through any of the seams in which it is contained, as shown at N, Fig. 1. When this happens to be the case, the well is sometimes made available by increasing its diameter until it taps some of the seams. This has been done by boring from the top, all the way down into the stratum of rock containing the oil, and is attended with nearly as much labor and expense as boring the well in the first instance. It also frequently happens that the seam intersected by the well is very small, or that the aperture into the well from the seam is very small, in either of which cases it is very liable to become clogged or stopped up, during the working of the well, by substances contained therein, which prevent the oil from flowing or being sucked into the well. These substances are either foreign matter—such as bits of rope, sticks, dirt, particles of rock, &c., which have dropped into the well—or are the result of coagulation or accumulation of matter contained in the crude oil itself, and forming what is known as "B. S.," and sometimes, probably also, the deposit of waxy matter known as crude paraffine, and, occasionally, calcareous or other mineral deposits. Attempts have been made to remove these stoppages—sometimes by enlarging the diameter of the well, as before stated, and at other times, when the obstruction is slight, by forcing air down to, or near the bottom of, the well, and allowing it suddenly to escape. It is desirable, in order to increase the productiveness of wells, as well as to prevent stoppages from obstructions, to have the well tap, or connect with, as many of the seams or crevices of the rock containing the oil as possible.

My invention consists in a method or process of increasing the productiveness of oil-wells by causing an explosion in the well at or near the oil-bearing point, whereby great heat is evolved and sudden expansion of air and gas is produced, which is followed by a consequent reaction, while the rock in the vicinity of the explosion is scoured and triturated, and in some instances fractured. The effect of such explosion is to soften or melt the "B. S." or paraffine, and, by the direct or reactive pressure of gas or air, to cleanse the seams as well as the face of the rock, thus detaching and removing all foreign substances, while, where fracture of the rock takes place, new seams are frequently opened, and the capacity of the well is increased; and in those cases in which it is desirable to confine the effect of the explosion to the rock in the immediate vicinity of the flask for the purpose of fracturing the rock and opening seams, my invention further consists in the employment of a superincumbent column of fluid as a tamping, in connection with the employment of the explosion. My invention also consists in certain improvements in device for operating and exploding the torpedoes.

My invention is applied in the following manner: I lower a flask, containing gunpowder or other powerful explosive material or gas, down the well until it reaches that portion of the well which passes through the oil-bearing rock. I then ignite the contents of the flask by the use of fulminate powder, electricity, or other means used to explode shells, torpedoes, or cartridges, and the explosion generates great heat, and the heated flame and gases are forced into all the fissures and cavities of the rock and soften, melt, or liquefy the paraffine or "B. S.;" while, upon contraction or condensation of the gases or vapor, a reaction takes place, whereby the obstructions are forced out of the seams and the passages are thereby reopened. At the same time the effect of the shock is to triturate and scour the well, detaching and removing all calcareous or mineral deposits.

Where it is desirable to fracture the rock, I make use of a fluid tamping, which is thus applied: When the flask is placed in position, if the well should not contain a sufficient amount of water to act as tamping, as it usually does, unless it has been pumped out, a sufficient quantity of water is introduced into the well before the contents of the flask are ignited, so that the column of fluid above the flask will have the requisite gravity to confine the effect of the explosion to the rock in the immediate vicinity of the flask, and so facilitate the fracture.

In order more fully to explain my method of operation, I will describe the apparatus which I prefer to use.

Fig. 2 represents a sectional view of a hollow flask, made of iron, glass, or other material, and filled with powder or other explosive material or gas, with a cover and means of letting the same down into the well and exploding the contents. *a* is the body of the flask containing explosive material. *b* is a cover screwed down on the top of the flask, water-tight, covering the aperture through which the explosive is introduced. *l l'* are two small lugs placed at or near the top of the flask and on opposite sides of the cover, to which cords are fastened to assist in lowering the flask into the well and in removing it, if, for any reason, the contents should not have exploded. *c* is a stuffing-box or gland, through which the wire *d* passes, which connects at one end with a small quantity of fulminating-powder upon the disks *e e'* at the extremity of the wire in the interior of the flask, and at the other end with a cord extending out of the top of the well and sufficiently strong to enable the operator to pull the wire *d* through the stuffing-box *c* with sufficient force to ignite the fulminating-powder on the disks *e e'* on the end of the wire *d*, which will readily ignite the explosive in the flask *a*. Should electricity be used to ignite the contents of the flask, the wire or wires can pass through the stuffing-box *c*, in like manner as the wire *d*; or the contents of the flask may be ignited by means of an arrangement shown at Fig. 3, in which *a* represents the flask, *g* and *g'* are percussion caps fitted upon the hollow nipples *h h'* on the top of the flask, connecting with the explosive inside and placed near together or on opposite sides of and equidistant from the wire *i*, which is connected with the top of flask in any convenient manner, and is used to assist in lowering the flask into or in raising it out of the well, and also to guide the weight *w* in its descent to the caps on the nipples. This cord also serves to suspend the torpedo in the proper position in or near the oil-bearing rock. *w* is an oblong weight of sufficient gravity to fall rapidly through the water and to explode the caps by the momentum obtained by its descent to the nipples, and should be of slightly greater diameter at the bottom than the space between the tops of the two nipples, with a hole running longitudinally through its center, of sufficient diameter to permit it to slip easily over the wire when the flask is in position. The charge may be exploded by allowing the weight to slide down the wire, when, on striking the caps, the explosion ensues. Varnish or other similar substances should be applied when the caps are put on the nipples, so as to render the connection between the caps and torpedo impervious to water. In Fig. 3 the flask has no detachable cover, but the explosive is introduced through an aperture in the bottom of the torpedo, which is stopped by a screw-plug, *p*, made to fit water-tight. I prefer to have the flask made of cast-iron or glass, but it should be sufficiently strong to resist the pressure of the water which may be above it when it is lowered to the required depth, and made impervious to moisture, so as to protect the dry contents. It should be of slightly less diameter than the diameter of the bore of the well, in order to slide down easily. The length of the flask will depend upon the amount of explosive force required, care being taken not to employ so great a force as to shatter or displace the sides of the well above the oil-bearing rock, which it is desired to have opened or ruptured by the explosion, to guard against which the flask should be somewhat shorter than the depth of the oil-bearing stratum.

Instead of the particular means above described for igniting the contents of the flask, any means used to explode shells, torpedoes, or cartridges, may be used for that purpose.

What I claim as my invention, and desire to secure by Letters Patent, is—

1. The method or process of increasing or restoring the productiveness of oil-wells by causing an explosion therein, at or near the oil-bearing point.

2. The method or process of increasing or restoring the productiveness of oil-wells by causing an explosion at or near the oil-bearing point, in connection with superincumbent fluid tamping, substantially as set forth.

3. In combination with a torpedo adapted to deep wells, the employment of a weight and guiding-cord for the purpose of exploding the charge, substantially as described.

4. The means herein described for suspending, adjusting, and exploding torpedoes in oil-wells at any desired or predetermined point, consisting of a wire or cord, attached to such torpedo and through which, as a medium of communicating ignition, the torpedo is exploded.

In witness whereof I, the said EDWARD A. L. ROBERTS, have hereunto set my hand.

EDWARD A. L. ROBERTS.

Witnesses:

GEO. WESTINGHOUSE, Jr.,

T. B. KERR.